United States Patent
Graas et al.

(10) Patent No.: US 8,201,038 B2
(45) Date of Patent: Jun. 12, 2012

(54) INTEGRATING DESIGN FOR RELIABILITY TECHNOLOGY INTO INTEGRATED CIRCUITS

(75) Inventors: Carole D. Graas, Jericho, VT (US); Pascal A. Nsame, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/568,968

(22) Filed: Sep. 29, 2009

(65) Prior Publication Data

US 2011/0078506 A1 Mar. 31, 2011

(51) Int. Cl.
*G01R 31/3173* (2006.01)
*G01R 31/40* (2006.01)

(52) U.S. Cl. .......... 714/745; 714/733
(58) Field of Classification Search ............. None
See application file for complete search history.

(56) References Cited

U.S. PATENT DOCUMENTS

| | | | |
|---|---|---|---|
| 4,885,684 A | 12/1989 | Austin et al. | |
| 4,945,302 A | 7/1990 | Janum | |
| 5,299,204 A | 3/1994 | Daniel | |
| 5,740,463 A * | 4/1998 | Oshima et al. ........ | 712/11 |
| 5,912,901 A | 6/1999 | Adams et al. | |
| 6,138,267 A | 10/2000 | Murai | |
| 6,489,912 B2 | 12/2002 | Lamb et al. | |
| 6,515,917 B2 | 2/2003 | Lamb et al. | |
| 6,546,505 B1 | 4/2003 | Swoboda et al. | |
| 6,662,136 B2 | 12/2003 | Lamb et al. | |
| 6,757,857 B2 | 6/2004 | Lamb et al. | |
| 7,278,177 B1 | 10/2007 | Duffie | |
| 7,394,273 B2 | 7/2008 | Hsu et al. | |
| 7,480,882 B1 | 1/2009 | Song et al. | |
| 7,509,537 B1 * | 3/2009 | Jensen et al. ........ | 714/47.2 |
| 7,529,998 B2 | 5/2009 | Reblewski | |
| 2007/0043531 A1 * | 2/2007 | Kosche et al. ........ | 702/182 |

OTHER PUBLICATIONS

Borkar, S., "Designing Reliable Systems from Unreliable Components: The Challenges of Transistor Variability and Degradation," IEEE Computer Society, 2005, pp. 10-16.
Srinivasan, et al., "The Case for Lifetime Reliability-Aware Microprocessors," The 31st International Symposium on Computer Architecture (ISCA-04), Jun. 2004, pp. 1-12.
Bower, et al., "Tolerating Hard Faults in Microprocessor Array Structures," International Conference on Dependable Systems and Networks (DSN) Florence, Italy, Jun. 2004, pp. 1-10.
Shin, et al., "A Framework for Architecture-level Lifetime Reliability Modeling," 37th Annual IEEE/IFIP International Conference on Dependable Systems and Networks (DSN'07), 2007, pp. 1-10.

* cited by examiner

*Primary Examiner* — Jeffrey A Gaffin
*Assistant Examiner* — Dipakkumar Gandhi
(74) *Attorney, Agent, or Firm* — Gibb I.P. Law Firm, LLC

(57) ABSTRACT

A method executes computerized instructions within an integrated and packaged semiconductor device using a centralized programming interface within the packaged semiconductor device to perform in-system preventive and recovery actions, configure and issue stimulus to chips, components and sensors within the semiconductor device. The method monitors chip, components and sensors within the packaged semiconductor device, using the centralized programming interface, to measure characteristics of the packaged semiconductor device in response to the stimulus. The structure including chips, components and sensors produce outputs representing the characteristics. The method performs an evaluation to determine whether the chip, component and sensor outputs are within predetermined limits, using the centralized programming interface; and reports occurrences of instances of the chip, component and sensor outputs being outside the predetermined limits, using the centralized programming interface, to an on-chip storage medium, external test equipment or computerized device outside of the packaged semiconductor device.

21 Claims, 8 Drawing Sheets

INTEGRATING DESIGN FOR RELIABILITY TECHNOLOGY INTO INTEGRATED CIRCUITS

BACKGROUND OF THE INVENTION

1. Field of the Invention

The embodiments herein generally relate to integrated circuit chips and more particularly to an integrated circuit chip having an enhanced programming and test interface and an associated method of monitoring, healing and testing the chip using the enhanced programming and test interface.

2. Description of Related Art

Nanoscale integrated circuit (IC) devices are prone to significant variation in threshold voltage caused by intrinsic aspects such as line-edge roughness, random dopant fluctuations, and body thickness variations in silicon-on-insulator devices. Such variation can lead to significant spreads in circuit delay, power, and robustness for digital ICs, and performance for analogs ICs.

Furthermore, the growing complexity of system hardware is defeating the enormous effort put forth by verification engineers to ensure system correctness. The reason is that verification is unable to keep up with modern high-productivity design solutions such as high-performance application specific integrated circuits (ASICs) and systems-on-a-chip (SoCs), which feature multiple complex hardware and software components connected by diverse sets of interfaces. Today, most, if not all, complex system designs are released containing latent bugs, which sometimes become evident only after a design reaches the market.

Ultimately, these challenges threaten the continued scaling of silicon fabrication technologies. A primary goal of transistor scaling is to reduce the cost of electronic devices. As devices scale to smaller geometries, however, they become less reliable, necessitating the inclusion of design for reliability features.

Reliability costs range from service and replacement to built-in solutions entailing area and design resources. These costs are increasing at technology nodes with higher natural failure rates, which require more robust and finer-grained reliability techniques.

BRIEF SUMMARY OF THE INVENTION

One embodiment herein comprises a computer-implemented structure and method of monitoring reliability, functional and structural performance of a semiconductor chip in order to recover from and prevent failure. The method comprises executing computerized instructions stored within a computer storage medium within the semiconductor chip using a centralized programming interface within the semiconductor chip to issue stimulus to components within the semiconductor chip. The method monitors sensors and components within the semiconductor chip, using the centralized programming interface, to measure characteristics of the semiconductor chip in response to the stimulus, the sensors and the components produce outputs representing the characteristics. The method performs an engineering evaluation to determine whether the sensor and component outputs are within predetermined limits, using the centralized programming interface; and reports occurrences of instances of the sensor and component outputs being outside the predetermined limits, using the centralized programming interface, to an on-chip storage unit, external test equipment or computerized device separate from the semiconductor chip. The instructions cause the centralized programming interface to alter actions, configurations, frequencies and types of the stimulus, the reports and the engineering evaluation depending upon whether the characteristics are within the predetermined limits.

Another embodiment performs the same method, where the centralized programming interface comprising access to memory mapped addresses of the sensors during the monitoring of the sensors. The monitoring of the sensors can be in response to incidents (static) or continuous (dynamic) events.

A semiconductor chip (and/or chip package) embodiment herein comprises a computer storage medium storing computerized instructions and a centralized programming interface in communication with the computer storage medium. The centralized programming interface executes the computerized instructions to issue stimulus to components within the semiconductor chip structure, the components are operatively connected to the centralized programming interface. Sensors are operatively connected to the centralized programming interface. The sensors measure characteristics of the semiconductor chip in response to the stimulus and the sensors produce sensor outputs representing the characteristics. The centralized programming interface performs an engineering evaluation to determine whether the sensor outputs are within the predetermined limits. The centralized programming interface also reports occurrences of instances of the sensor outputs being outside the predetermined limits to a computerized device outsite of the semiconductor chip. The instructions cause the centralized programming interface to alter frequencies and types of the stimulus and the engineering evaluation depending upon whether the characteristics are within the predetermined limits.

In another embodiment, the centralized programming interface is operatively connected to memory mapped addresses of the sensors and the centralized programming interface monitors the sensors in response to incidents (statically) or continuously (dynamically).

BRIEF DESCRIPTION OF THE DRAWING

The embodiments of the invention will be better understood from the following detailed description with reference to the drawings, in which.

DETAILED DESCRIPTION

Figure 1:
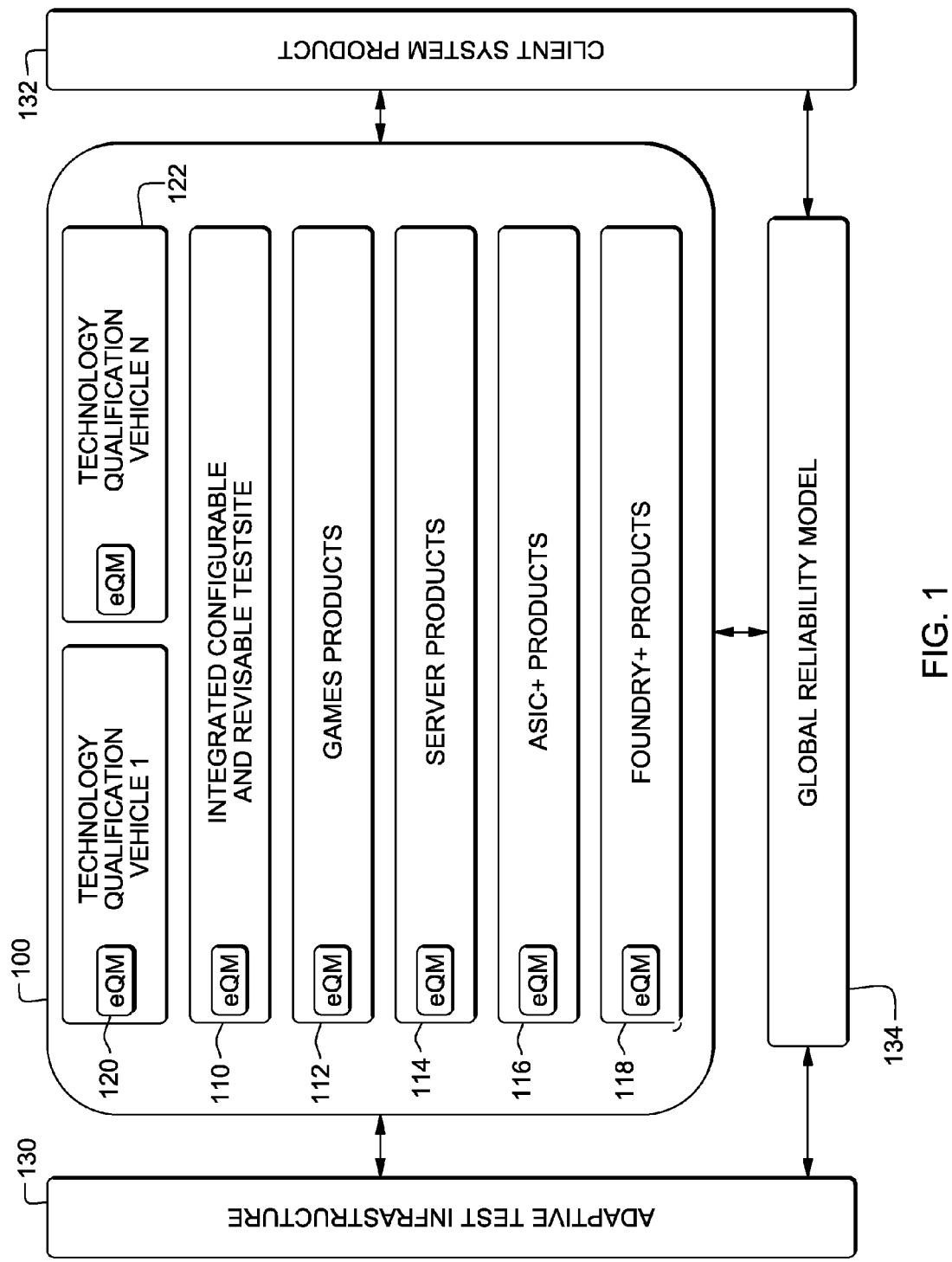
FIG. 1 is a schematic diagram illustrating a virtual qualification platform (VQP)

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

For a given application condition, there is a growing gap between the expected reliability targets of semiconductor products and the specified functionality of integrated circuits at nanometer technology nodes. In order to address these concerns, the embodiments herein provide a structure, system and method to efficiently utilize design for reliability technology in integrated circuits by means of a standardized on-product service processor macro structure. The embodiments herein utilizes a memory mapped address to interface with application function in mission mode; store stimulus and signatures; integrate quality and reliability sensors; integrate various embedded analog and digital cores; executes test programs and test patterns; and utilize joint test action group (JTAG) and network input/output (I/O) connections.

Reliability is a design engineering discipline that applies scientific knowledge to assure a product will perform its intended function for the required duration within a given environment. This includes designing in the ability to maintain, test, and support the product throughout its total life cycle. Limitations of this discipline include high failure in time (FIT) rates; lengthy reliability evaluation; reliability engineering (RE) bridging scalability; defect detractors; and power and thermal control issues. The design and methodology presented herein, with enhanced-circuit limited reliability (CLR), utilizes Virtual Qualification Platform (VQP); Embedded Quality Management (eQM); On-line Global Reliability Model (OGRM); Embedded Reliability Engineering (RE) Evaluation; and Dynamic Product Grading (DPG).

Figure 2:
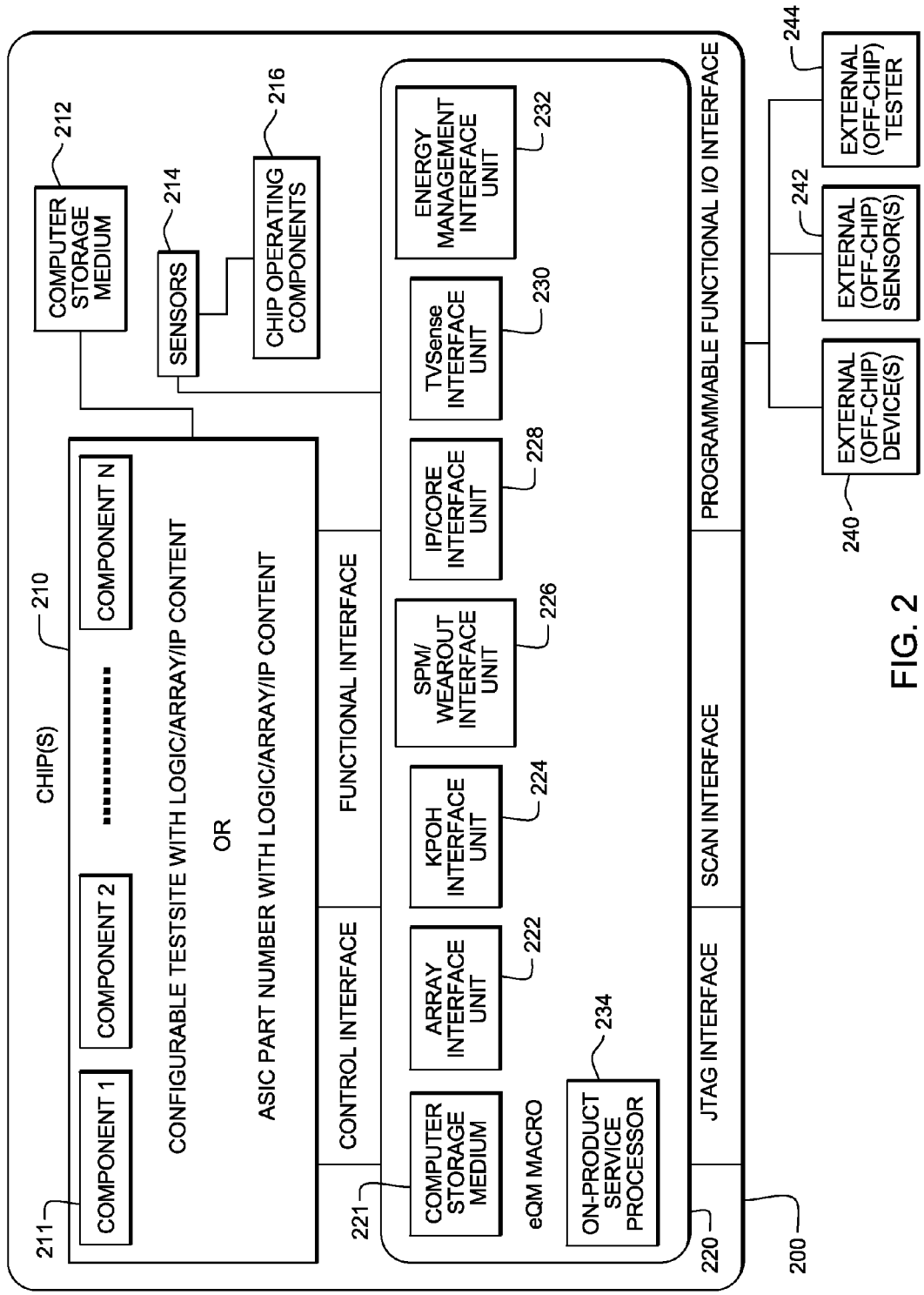
FIG. 2 is a schematic diagram illustrating a semiconductor integrated circuit chip structure containing an enhanced test interface.

FIG. 1 illustrates the virtual qualification platform (VQP) 100 that is operatively connected to (by being operatively connected to, as used herein, one or more items are indirectly or directly connected to each other, through wired connections, wireless connections, various networks, etc.) an adaptive test infrastructure 130, the global reliability model 134, and a client system product 132. The virtual qualification platform 100 includes one or more technology qualification vehicles 120, 122. Further, the embodiments herein include an embedded quality management feature within each of the integrated configurable and revisable test sites 110, game products 412, server products 114, ASIC products 116, and foundry products 118. The embedded quality management feature (identified as eQM in the drawings and at various points herein) is illustrated in FIG. 2 as item 220 and is explained in greater detail below. Items 100-134 represent key aspects of the product development optimized for unique or hybrid applications.

FIG. 2 illustrates an integrated circuit chip (and/or chip package) 200 that includes a permanently embedded quality management intellectual property (IP) feature (an on-product service processor) with an enhanced test interface 220. The semiconductor chip 200 comprises a computer storage medium 212 storing computerized instructions, various chip operating components 216 and various sensors 214. The various chip operating components 216 comprise logic circuits, memory circuits, power circuits, etc., and operate to perform the intended function of the chip 200. The sensors 214 measure the characteristics (output signal, temperature, voltage, etc.) of the chip operating components 216.

The eQM feature comprises a centralized programming interface (computer processor) 220 in communication with the computer storage medium 212. The centralized programming interface 220 includes many different forms of interfaces including a control interface, functional interface, JTAG interface, scanned interface, programmable functional input/output interface, etc.

The centralized programming interface 220 executes the computerized instructions stored within the computer storage medium 212 to take actions and issue stimulus to components 216 within the semiconductor chip 200. As shown, the sensors 214 and the components 216 are operatively connected to the centralized programming interface 220. The sensors 214 measure the characteristics and signal outputs (signatures) of components 216 of the semiconductor chip 200 that occur in response to the stimulus. The sensors 214 produce sensor outputs representing such characteristics. Such characteristics comprise, for example, temperature, voltage, hour usage, negative bias temperature instability, power management, scaling parameters, etc. The sensors and components include temperature monitor, voltage monitor, power-on hour usage monitor, wearout monitor, power management unit, storage unit, service processor, array interface unit, intellectual property core interface unit, device scaling parametric macro, control interface, functional interface, JTAG interface, Scan interface, and programmable functional I/O interface.

The chip 200 can be configured as a re-usable test site 210 with logic/array/intellectual property content in one embodiment or as an ASIC part number with logic/array/intellectual property content in an alternate embodiment. The centralized programming interface 220 utilizes the configurable test site 210 and or ASIC part number when performing various testing. The eQM macro 210 is configured to operate as a standalone IP core and as an integrated chip.

The centralized programming interface 220 performs preventive and recovery actions including engineering evaluations to determine whether the sensor outputs are within predetermined limits. The engineering evaluation reviews the various characteristics, the operating conditions that were present when the sensors observed the characteristics and stimulus that was provided, to evaluate whether the sensor outputs are within the predetermined numerical limits for each of the different characteristics. The centralized programming interface 220 reports occurrences of instances of the sensor outputs being outside the predetermined limits to one or more external (off-chip) computerized device(s) 240 (such as other computers, other networks, printing devices, graphic user interfaces, etc.) that are physically separated from, but in permanent or temporary communication with, the semiconductor chip 200.

The instructions stored in the computer storage medium 212 can cause the centralized programming interface 220 to perform actions, alter frequencies and types of the stimulus and the engineering evaluation, depending upon whether the characteristics are within the predetermined limits. Alternatively, the type of frequency of stimulus can be maintained in a constant state. Therefore, the centralized programming interface 220 can change the types of stimulus that are provided to the various operating components 216 and can alter the frequency with which such stimulus are applied to the chip operating components 216 depending upon the sensor outputs. Therefore, for example, in a closed loop monitoring scenario, the eQM macro may start to perform engineering evaluations when the rate of change of a given chip parameter is above specified limits for a given product in the field. The centralized programmable interface 220 comprises an exclusive connection point between the sensors 214 and the computerized device outside the semiconductor chip 200. Therefore, the sensors 214 are only connected to the centralized programming interface 220 and are not connected to any other devices within the chip such that an autonomic, self-stressing and self-healing capabilities are achieved.

The instructions cause the centralized programmable interface 220 to issue such stimulus both during a manufacturing stage of the semiconductor chip 200 and during a post-manufacturing in-field and in-system usage of the semiconductor chip 200. Therefore, the embodiments herein allow the performance and operability of the chip to be measured, not only as it is being manufactured, but also throughout it's useful life while it is being used by the customer in the field and in the target system application.

One aspect of the embodiments herein is that the sensors 214 are grouped into classes of sensors, and the centralized programming interface 220 has dedicated interfaces to each of the classes of sensors and each class of components 214. For example, the centralized programming interface 220 includes an array interface unit 222, a kilo power-on-hour (KPOH) interface unit 224, a wearout interface unit 226, an (IP) intellectual property core interface unit 228, a temperature voltage (TV) sense interface unit 230, and an energy management interface unit 232.

Note that the various interface units 221-232 shown in FIG. 2 are merely exemplary and that the centralized programmable interface 220 could include less interface units or many more interface units, depending upon the specific application and the specific chip with which the centralized programming interface 220 (i.e. eQM Macro) will be utilized. In one specific example, the 45 nm (Cu45) eQM IP macro circuit content can include IP families such as static random access memory with at least one port (SRAM1D (P315)); at least one type of register file (RF1 and RF2); read only memory (ROM); application specific integrated circuit (ASIC) embedded dynamic random access memory (eDRAM); static random access memory optimized for one of high performance and low power (SRAM2S (DP608)); register file optimized for one of density and functionality (RFUD, Ultra Dense (P315)); register array optimized for one of data access and size (RA 2P, 4P); static random access memory optimized for one of data access and size (SRAM2T (Base of P315)); static random access memory optimized for one of density and function (SRAM1P, Ultra Performance (F404)); phase locked loop (PLL), temperature voltage sensor (TVSense); device scaling parametric measurement macro (SPM); wearout mechanism monitor one of negative bias temperature instability (NBTI), electromigration (EM), hot carrier, dielectric integrity; power management unit; kilo power-on-hour (KPOH) Monitor; array interface unit, intellectual property core interface unit, control interface, functional interface, JTAG interface, scan interface, and programmable functional I/O interface and PowerPC embedded service processor (PPC405).

Thus, with embodiments herein, all sensors within a given class of sensors are all exclusively connected only to an interface unit within the centralized programming interface 220 that is specifically dedicated to that class of sensors.

The array interface unit 222 comprises a programmable interface unit for collecting, storing and transferring reliability engineering data from array component class sensors (such as memory arrays, storage arrays, etc.), proactively managing array failure conditions, independently and/or dependently controlling the rate, size and accuracy of array reliability engineering measurements based on product workload conditions for a given temperature, voltage, frequency, noise, jitter, duty cycle, slew rate, data path, and energy setting.

The KPOH interface unit 224 comprises a programmable interface unit for collecting, storing and transferring on/off data from on/off die component class sensors, proactively managing on/off cycles related failure conditions, and independently and/or dependently controlling the rate, size and accuracy of on/off measurements based on product workload conditions for a given temperature, voltage, frequency, noise, jitter, duty cycle, slew rate, data path, and energy setting.

The wearout interface unit 226 comprises a programmable interface unit for collecting, storing and transferring wearout data from wearout die component class sensors, proactively managing wearout related failure conditions, and independently and/or dependently controlling the rate, size and accuracy of wearout measurements based on product workload conditions for a given temperature, voltage, frequency, noise, jitter, duty cycle, slew rate, data path, and energy setting.

The IP/Core interface unit 228 comprises a programmable interface unit for collecting, storing and transferring functional data from information processing and core die component class sensors, proactively managing functional failure conditions, and independently and/or dependently controlling the rate, size and accuracy of functional measurements based on product workload conditions for a given temperature, voltage, frequency, noise, jitter, duty cycle, slew rate, data path, and energy setting.

The TVSense interface unit 230 comprises a programmable interface unit for collecting, storing and transferring temperature and voltage data class sensors, proactively managing temperature and voltage related failure conditions, and independently and/or dependently controlling the rate, size and accuracy of temperature & voltage measurements based on product workload conditions for a given frequency, noise, jitter, duty cycle, slew rate and datapath, and energy setting.

The energy management interface unit 232 comprises a programmable interface unit for collecting, storing and transferring energy data from energy data die component class sensors, proactively managing application-related failure conditions, and independently and/or dependently controlling the rate, size and accuracy of application measurements based on product workload conditions for a given temperature, voltage, frequency, noise, jitter, duty cycle, slew rate, data path, and energy setting.

Figure 3:
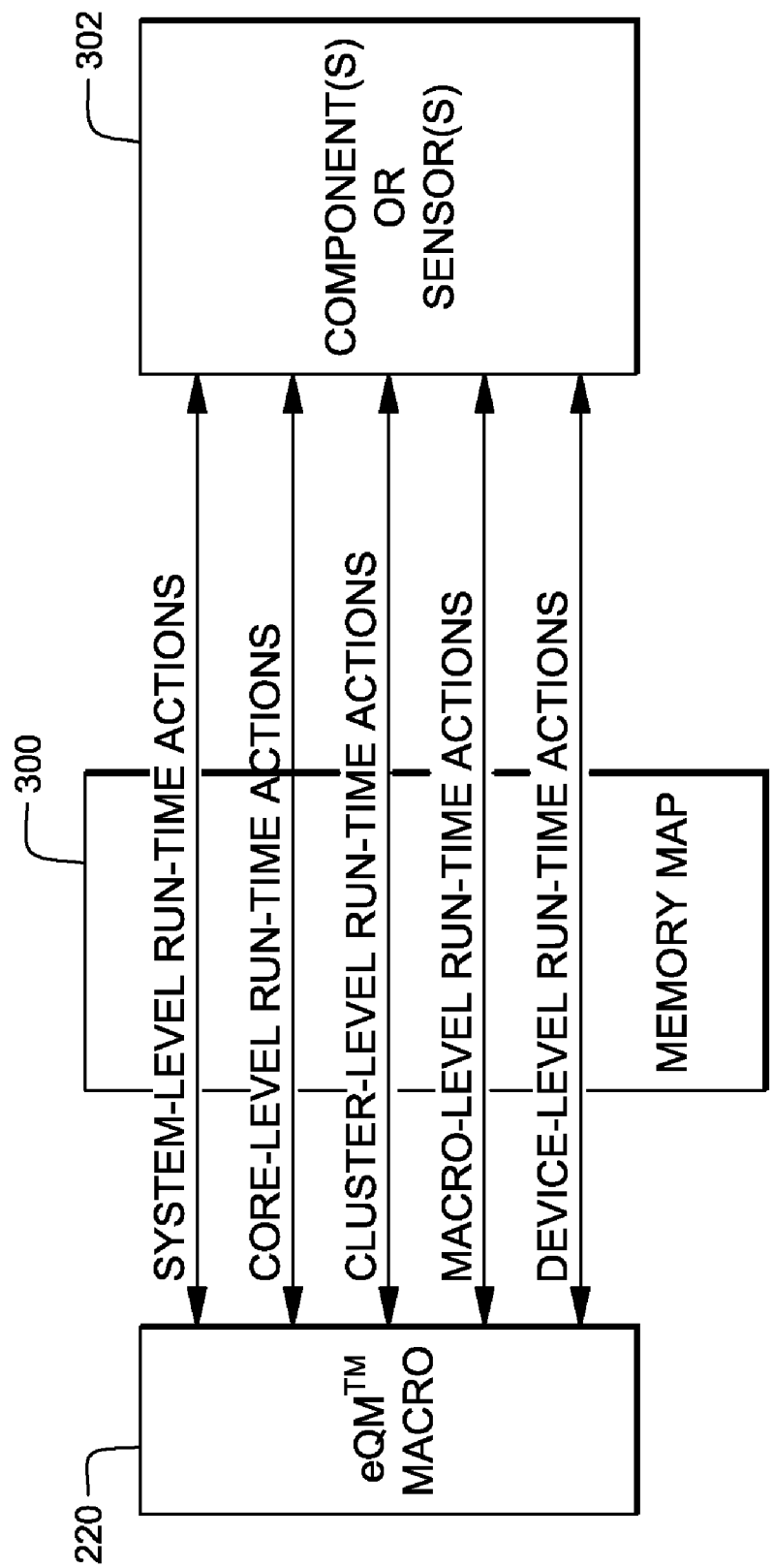
FIG. 3 is a schematic diagram illustrating the relationship between the enhanced test interface, a memory map and an integrated circuit chip core.

FIG. 3 is a schematic diagram illustrating the relationship between the enhanced test interface 220, a memory map 300 and the integrated circuit chip core 302. The centralized programming interface 220 is operatively connected to memory mapped addresses of the sensors 300, which allows of the centralized programming interface 220 the same access to all components of the chip that the core 302 has. Therefore, the centralized programming interface 220 has access to the system-level run-time actions, the core-level run-time actions, the cluster-level run-time actions, the macro-level run-time actions, and the device-level run-time actions as indicated by the arrows in FIG. 3

Figure 4:
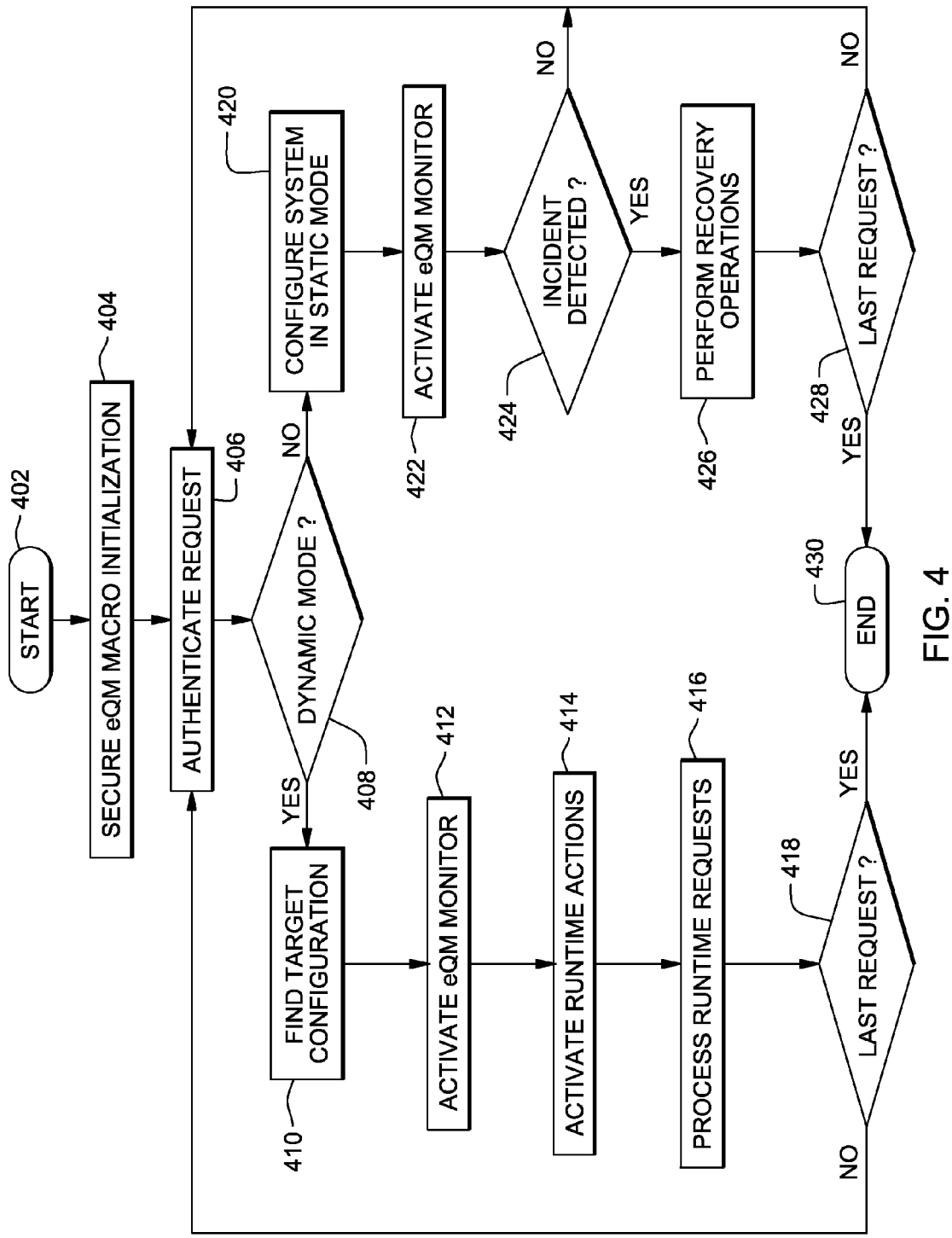
FIG. 4 is a flow diagram illustrating a method of an embodiment of the invention.

The centralized programming interface 220 can monitor the sensors and take actions both in response to incidents (statically or open loop to recover from a failure); and dynamically in a continuous process (closed loop process to prevent a failure from occurring). This is shown, for example, in the flowchart in FIG. 4 where, after the process starts in item 402, the embedded quality management feature performs a secure initialization in item 404. Any request made to the system is authenticated in item 406.

Item 408 determines whether the centralized programming interface is operating in a dynamic or static mode. If it operates in dynamic mode, the continuous process (closed loop) is performed in items 410-418. If it operates in static modes (responding individually to incidents) processing proceeds to items 420-428.

In the close loop processing, in item 410, the process finds a target configuration. In item 412, the process activates the embedded quality management monitor. In item 414, the process activates the runtime actions and in item 416, processes the runtime requests.

In static processing, the method configures the system in static mode in item 420. Then, in item 422, the embedded quality management monitor is activated. If an incident is not detected in item 424, processing returns to item 406. However, if an incident is detected, processing proceeds to item 426 where the methodology performs recovery operations. Items 418 and 428 determine whether the request is the last request. If it is not, processing returns to item 406. If it is the last request, processing and RCE in item 430.

Figure 5:
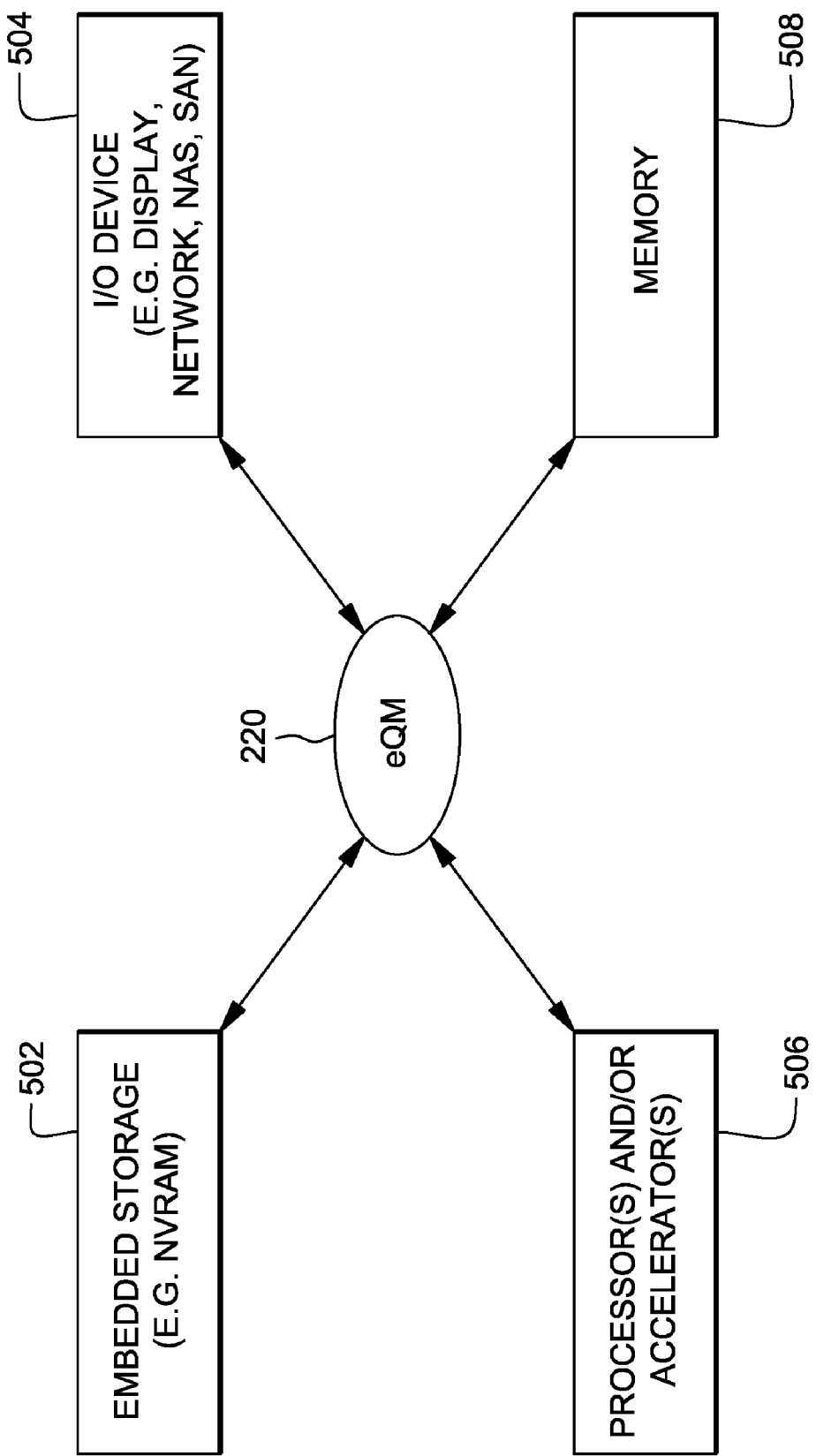
FIG. 5 is a schematic diagram illustrating the relationship between the enhanced test interface and various items within an integrated circuit chip.

FIG. 5 illustrates the embedded quality management feature 220 and the relationship to various elements within the integrated circuit chip. As shown in FIG. 5, the embedded quality management feature 220 has access to embedded storage 502 (e.g., NVRAM, etc.); input/output devices 504 (e.g., display, network, NAS, SAN, etc.); processor(s) and/or accelerator(s) 506; memory 508, etc., such that all hardware and software components of the semiconductor chip within a given product are accessible to the eQM macro.

Figure 6:
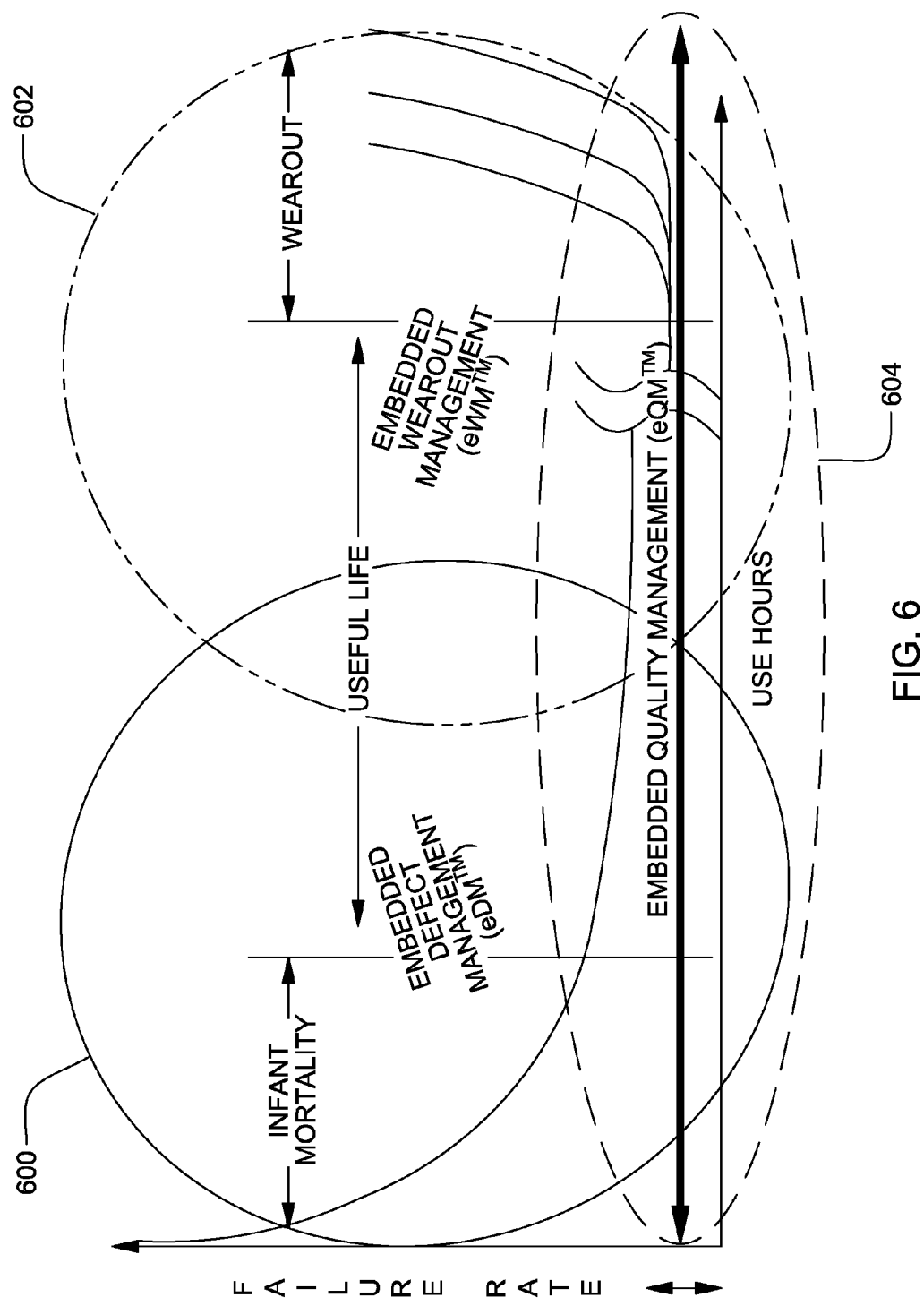
FIG. 6 is a schematic diagram illustrating the relationship between embedded defect management, and embedded wearout management, and embedded quality management when grafted over failure rate and use of hours.

FIG. 6 is a schematic diagram illustrating the relationship between embedded defect management 600, and embedded wearout management 602, and embedded quality management 604 when grafted over failure rate and use of hours showing that quality and reliability grading of a given product integration the eQM macro can be adaptively controlled in the field with embodiments herein.

Figure 7:
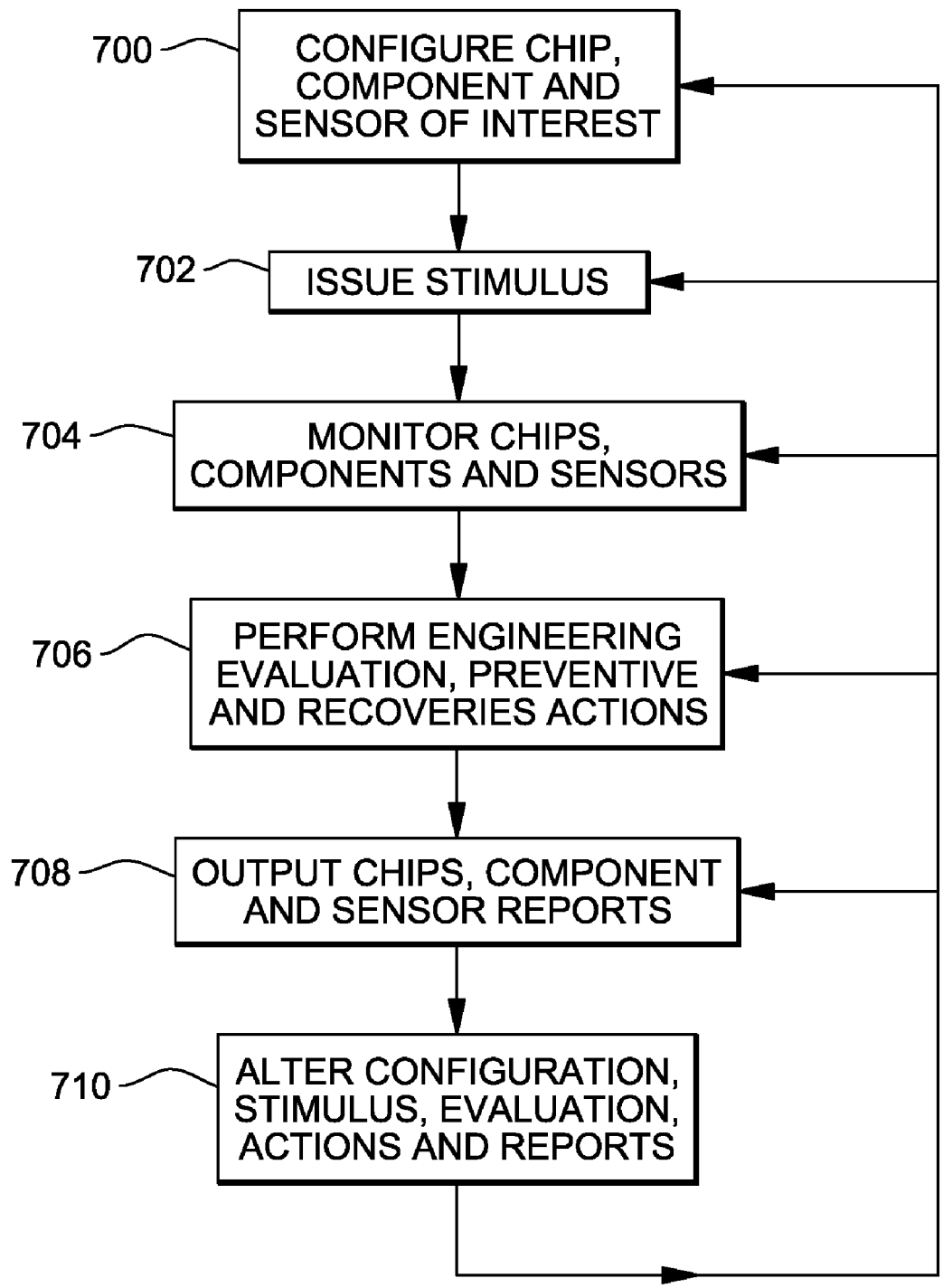
FIG. 7 is a flow diagram illustrating a method of an embodiment of the invention.

FIG. 7 is a flowchart illustrating one specific computer-implemented method of monitoring reliability, functionality and performance of a semiconductor chip. In item 700, the method executes computerized instructions stored within a computer storage medium within the semiconductor chip using a centralized programming interface within the semiconductor chip to take actions as appropriate and issue stimulus to components within the semiconductor chip. In item 702, the method monitors sensors within the semiconductor chip, using the centralized programming interface, to measure characteristics of the semiconductor chip in response to the stimulus. As mentioned above, the sensors produce the sensor outputs that represent the characteristics. The centralized programming interface has access to memory mapped addresses of the sensors during the monitoring of the sensors 702. Further, the monitoring of the sensors 702 can be static or dynamic.

In item 704, the method performs an engineering evaluation to determine whether the sensor outputs are within predetermined limits, using the centralized programming interface. In item 706, the method reports occurrences of instances of the sensor outputs being outside the predetermined limits, using the centralized programming interface, to a computerized device separate from the semiconductor chip. As shown in item 708, the instructions cause the centralized programming interface to alter actions, frequencies and types of the stimulus 702 and alter the engineering evaluation 704 depending upon whether the characteristics are within the predetermined limits.

The resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
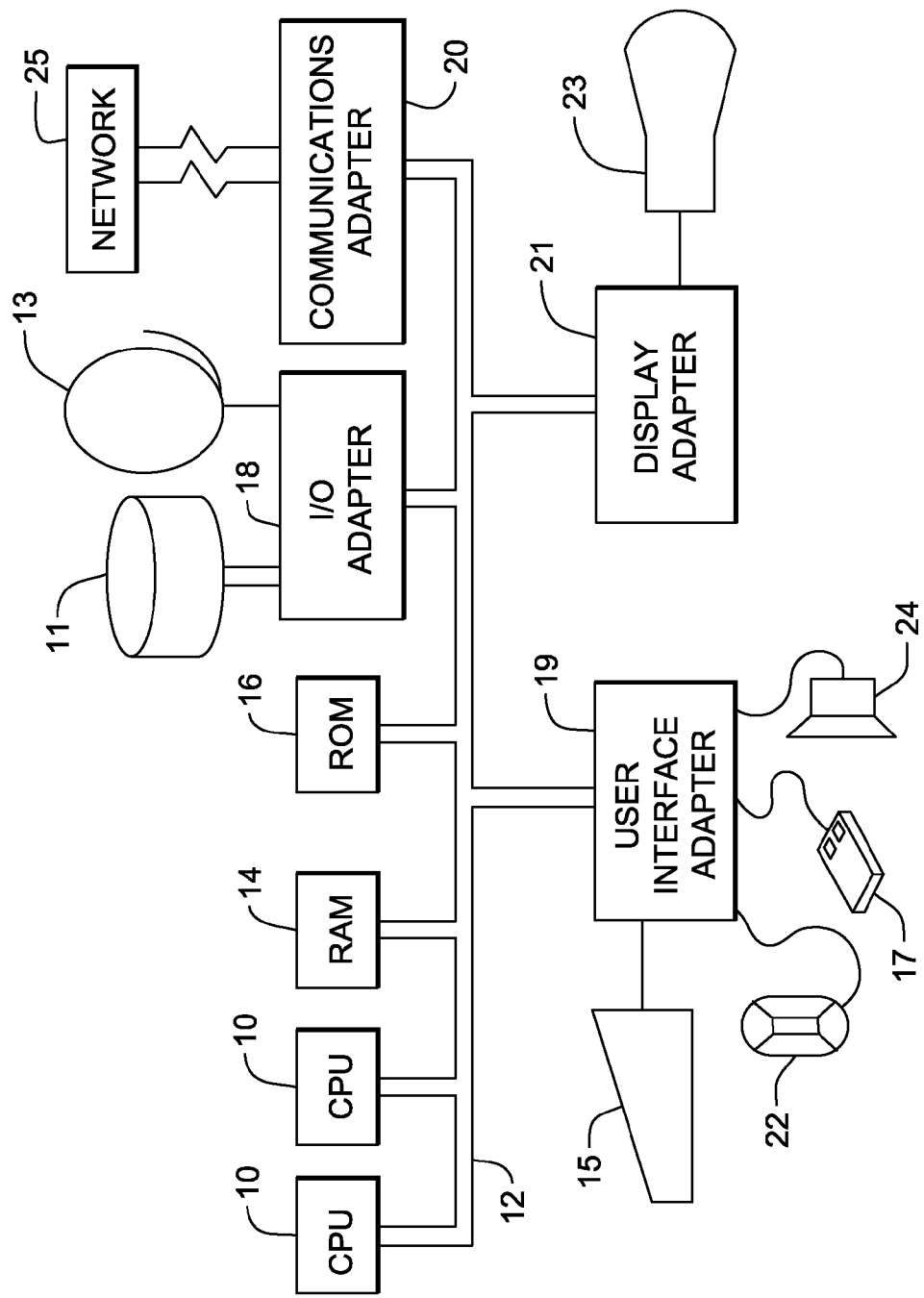
FIG. 8 is a schematic diagram illustrating various hardware elements according to embodiments herein.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein integrate qualification with dynamic quality management to meet customer's needs in the field—even adjusting for evolving needs. This is enabled by embedded, smart quality management IP and eliminates traditional reliability stresses and need for Burn-in-Boards (BiBs), while improving IP coverage of reliability models. This process and system provides innovative mitigation solutions for design errors with less redesigns. The embodiments herein operate well with a unique reliability TS methodology. Further, the embodiments herein are more competitive in all customer application spaces.

The embedded quality management (eQM) feature herein simplifies the qualification methodologies and enables precise control over the entire shape of the semiconductor reliability curve for each customer application. As part of this concept, the embedded defect management (eDM) feature herein targets defect and systematic failure modes detection, modeling, removal or inactivation, and monitoring, across potentially all chips.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

The invention claimed is:

1. A computer-implemented method of monitoring reliability, functional, and structural performance of a semiconductor chip in order to recover from and prevent failure, said method comprising:

executing computerized instructions stored within a computer storage medium within said semiconductor chip using a centralized programming interface within said semiconductor chip to issue stimulus to sensors and components within said semiconductor chip;

monitoring said sensors and components within said semiconductor chip, using said centralized programming interface, to measure characteristics of said semiconductor chip in response to said stimulus, said sensors and components producing component outputs representing said characteristics;

performing preventive and recovery actions including engineering evaluations to determine whether said component outputs are within predetermined limits, using said centralized programming interface; and reporting occurrences of instances of said component outputs being outside said predetermined limits, using said centralized programming interface, as reports to at least one of said computer storage medium, external test equipment and a computerized device separate from said semiconductor chip, said instructions causing said centralized programming interface to alter preventive and recovery actions, configurations, frequencies and types of said stimulus, said reports and said engineering evaluation depending upon whether said characteristics are within said predetermined limits.

2. The computer-implemented method according to claim 1, wherein said sensors and components comprise at least one of: a temperature monitor, a voltage monitor, a power-on hour usage monitor, a wearout monitor, a power management unit, a storage unit, a service processor, an array interface unit, an intellectual property core interface unit, a device scaling parametric macro, a control interface, a functional interface, a JTAG interface, a scan interface, and a programmable functional I/O interface.

3. The computer-implemented method according to claim 1, said centralized programmable interface comprising an exclusive connection point between said sensors and said computerized device separate from said semiconductor chip.

4. The computer-implemented method according to claim 1, said instructions causing said centralized programmable interface to take actions and issue said stimulus during a manufacturing stage of said semiconductor chip and during a post-manufacturing in field usage of said semiconductor chip.

5. The computer-implemented method according to claim 1, said sensors and components being grouped into classes of sensors and components, said centralized programming interface comprising dedicated connections to each of said classes of sensors and components.

6. A computer-implemented method of monitoring reliability, functional, and structural performance of a semiconductor chip in order to recover from and prevent failure, said method comprising:

executing computerized instructions stored within a computer storage medium within said semiconductor chip using a centralized programming interface within said semiconductor chip to issue stimulus to sensors and components within said semiconductor chip;

monitoring said sensors and components within said semiconductor chip, using said centralized programming interface, to measure characteristics of said semiconductor chip in response to said stimulus, said sensors and components producing component outputs representing said characteristics, said centralized programming interface comprising access to memory mapped addresses of said sensors and components during said monitoring of said sensors and said components, and said monitoring of said sensors and said components being one of static and dynamic;

performing preventive and recovery actions including engineering evaluations to determine whether said component outputs are within predetermined limits, using said centralized programming interface; and reporting occurrences of instances of said components outputs being outside said predetermined limits, using said centralized programming interface, as reports to at least one of said computer storage medium, external test equipment and a computerized device separate from said semiconductor chip, said instructions causing said centralized programming interface to alter preventive and recovery actions, configurations, frequencies and types of said stimulus, said reports and said engineering evaluation depending upon whether said characteristics are within said predetermined limits.

7. The computer-implemented method according to claim 6, wherein said sensors and components comprise at least one of: a temperature monitor, a voltage monitor, a power-on hour usage monitor, a wearout monitor, a power management unit, a storage unit, a service processor, an array interface unit, an intellectual property core interface unit, a device scaling parametric macro, a control interface, a functional interface, a JTAG interface, a scan interface, and a programmable functional I/O interface.

8. The computer-implemented method according to claim 6, said centralized programmable interface comprising an exclusive connection point between said sensors and said computerized device separate from said semiconductor chip.

9. The computer-implemented method according to claim 6, said instructions causing said centralized programmable interface to take actions and issue said stimulus during a manufacturing stage of said semiconductor chip and during a post-manufacturing in field usage of said semiconductor chip.

10. The computer-implemented method according to claim 6, said sensors and components being grouped into classes of sensors and components, said centralized programming interface comprising dedicated connections to each of said classes of sensors and components.

11. A semiconductor chip comprising:
a computer storage medium storing computerized instructions;
a centralized programming interface in communication with said computer storage medium, said centralized programming interface executing said computerized instructions to issue stimulus to components within said semiconductor chip, said components being operatively connected to said centralized programming interface; and
sensors operatively connected to said centralized programming interface, said sensors measuring characteristics of said semiconductor chip in response to said stimulus, said sensors producing sensor outputs representing said characteristics,
said centralized programming interface performing an engineering evaluation to determine whether said sensor outputs are within predetermined limits, and
said centralized programming interface reporting occurrences of instances of said sensor outputs being outside said predetermined limits as reports to at least one of said computer storage medium, external test equipment and a computerized device separate from said semiconductor chip,
said instructions causing said centralized programming interface to alter preventive and recovery actions, configurations, frequencies and types of said stimulus, type of said reports and said engineering evaluation depending upon whether said characteristics are within said predetermined limits.

12. The semiconductor chip according to claim 11, wherein said sensors and components comprise at least one of: a temperature monitor, a voltage monitor, a power-on hour usage monitor, a wearout monitor, a power management unit, a storage unit, a service processor, an array interface unit, an intellectual property core interface unit, a device scaling parametric macro, a control interface, a functional interface, a JTAG interface, a scan interface, and a programmable functional I/O interface.

13. The semiconductor chip according to claim 11, said centralized programmable interface comprising an exclusive connection point between said sensors and said computerized device separate from said semiconductor chip.

14. The semiconductor chip according to claim 11, said instructions causing said centralized programmable interface to take actions and issue said stimulus during a manufacturing stage of said semiconductor chip and during a post-manufacturing in field usage of said semiconductor chip.

15. The semiconductor chip according to claim 11, said sensors and components being grouped into classes of sensors and components, said centralized programming interface comprising dedicated connections to each of said classes of sensors and components.

16. An integrated and packaged semiconductor device comprising:
a computer storage medium storing computerized instructions;
at least one processing component;
at least one sensor;
a centralized programming interface in communication with said computer storage medium, said component and said sensor,
said centralized programming interface executing said computerized instructions to configure and issue stimulus to chips, said component and said sensor within said packaged semiconductor device,
said components being operatively connected to said centralized programming interface using a topology based on at least one dimension; and said topology comprising one of one-dimensional, two-dimensional, and three-dimensional,
said sensors being operatively connected to said centralized programming interface, said sensor measuring characteristics of said packaged semiconductor device in response to said stimulus,
said chip, said component and said sensor producing component outputs representing said characteristics,
said centralized programming interface being operatively connected to memory mapped addresses of said chips, said component and said sensor,
said centralized programming interface configuring said chips, said components and said sensors one of statically and dynamically, said centralized programming interface monitoring said chips, said component and said sensor one of statically and dynamically, said centralized programming interface performing an engineering evaluation to determine whether said component outputs are within predetermined limits, and said centralized programming interface reporting occurrences of instances of said component outputs being outside said predetermined limits as reports to at least one of said computer storage medium, external test equipment and a computerized device separate from said semiconductor chip, said instructions causing said centralized programming interface to alter preventive and recovery actions, configurations, frequencies and types of said stimulus, said engineering evaluations and said reports depending upon whether said characteristics are within said predetermined limits.

17. The semiconductor device chip according to claim 16, said characteristics comprising at least one of a temperature, a voltage, an hour usage, a negative bias temperature instability, power management, and scaling parameters.

18. The semiconductor device chip according to claim 16, said centralized programmable interface comprising an exclusive connection point between said sensors and said computerized device outside said semiconductor chip.

19. The semiconductor device according to claim 16, said instructions causing said centralized programmable interface to take actions and issue said stimulus during a manufacturing stage of said semiconductor chip and during a post-manufacturing in field usage of said semiconductor chip.

20. The semiconductor device according to claim 16, said sensors being grouped into classes of sensors, said centralized programming interface comprising dedicated connections to each of said classes of sensors.

21. The semiconductor device according to claim 16, said components being grouped into classes of components, said centralized programming interface comprising dedicated connections to each of said classes of components.

* * * * *